July 10, 1928.
G. J. DUNBAUGH, JR
1,676,534
LIQUID LEVEL INDICATING MEANS
Filed Sept. 14, 1923
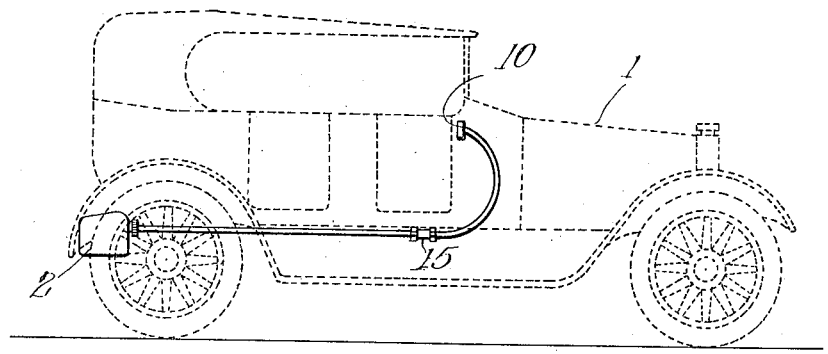
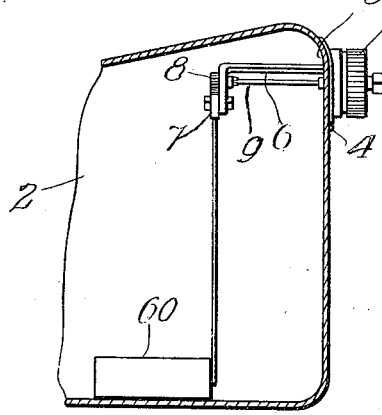
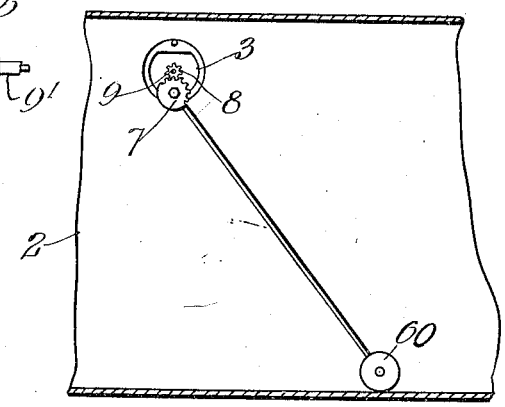
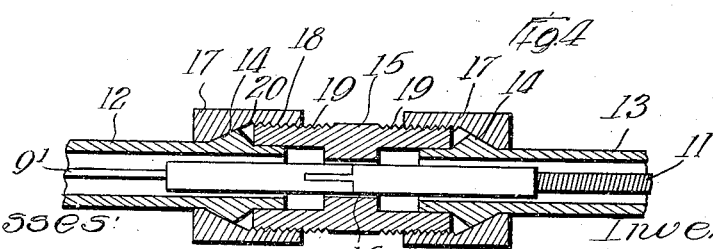
Witnesses:
W. P. Kilroy
Harry E. White
Inventor:
George J. Dunbaugh Jr
By Hill & Hill Attys.

Patented July 10, 1928.

1,676,534

UNITED STATES PATENT OFFICE.

GEORGE J. DUNBAUGH, JR., OF CHICAGO, ILLINOIS, ASSIGNOR TO CHAMPION MANUFACTURING COMPANY, OF CHICAGO, ILLINOIS, A CORPORATION OF ILLINOIS.

LIQUID-LEVEL-INDICATING MEANS.

Application filed September 14, 1923. Serial No. 662,650.

My invention relates to improvements in indicating means, and more particularly to means for indicating the level of liquid in a container at remote points, as for instance, for indicating at the dashboard of a motor vehicle the level of the gasoline in the tank in the rear of the car.

The invention has among its other objects the production of a device of the kind described which is simple, convenient, durable, reliable, efficient and satisfactory for use wherever found applicable.

Another object of my invention is to provide a device of the kind described which shall be extremely economical of construction.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 1 shows my device as applied to a motor vehicle;

Fig. 2 is a sectional view of the float and means operated thereby;

Fig. 3 is a side view of the same; and

Fig. 4 is a sectional detail showing the connection or coupling between the flexible and solid shafts.

In the drawings, wherein I have illustrated the preferred embodiment of my invention, there is shown a motor vehicle 1, having a container or tank 2 of any suitable size and shape arranged at any point thereof, as for instance, in the rear, said tank having the usual filling openings and also an outlet opening 3 therein. Generally, in order to ascertain the quantity of liquid in the tank, it is necessary that the operator go directly to the tank and obtain the measurement of the liquid therein. This is very inconvenient, and with my improved device it is not necessary for the driver to leave his seat to obtain the desired information.

A fitting 4 is adapted to be positioned over the outlet 3 of the tank to close the same, and a screw cap 5 co-operates with said fitting to maintain the parts of the device in their desired relation. A bracket 6 is secured to the fitting and extends within the tank, as shown more particularly in Figs. 2 and 3. A float 60, arranged within the tank, is carried by a gear 7 rotatably journaled on the bracket 6, and said gear meshes with a gear 8 arranged adjacent thereto upon a solid shaft 9 extending through the bracket and if cooperable with a solid shaft section 9' projecting outwardly of the tank for quite a substantial distance to adjacent the dashboard of the vehicle. An indicator 10 connected to the float-operated mechanism is mounted on the dashboard so as to be easily visible while the operator is seated.

In operation, the float will be moved up or down as determined by the level of the liquid in the tank, such movement being communicated through the gears to the solid shaft 9, 9'. In order to transmit the movement of this shaft to the indicator 10, it is necessary that some form of drive be used that will compensate for the change of direction of the rotational axis of the shaft, and for this purpose I prefer to use a short section of flexible shafting 11 extending from the indicator and detachably connected at its other end to the end of the solid shaft. Of course, it is possible to have the entire length of shafting from the indicator to the float mechanism made of flexible shafting, but as this material is rather expensive, I prefer to use as little of this material as possible. The cost of the flexible shafting is approximately about ten times as great as that of the solid shafting used.

A sheathing or sleeve 12 is used to encase the solid shaft, and a similar sheathing 13, formed to the shape desired, is used to encase the flexible shaft. The adjacent ends of the sleeves or sheathings 12 and 13 are spaced apart as shown more particularly in Fig. 4, and the sleeves have tapered enlargements 14 a slight distance inwardly of their free ends.

A coupling section 15 has a bore 16 therethrough to substantially provide a bearing for the cooperating ends of the solid and flexible shafts and prevent their accidental lateral separation. The ends of the member 15 are externally threaded as at 19 and are internally enlarged to slidably receive the ends of the opposed sheathing sections 12 and 13, and are limited in their longitudinal movement thereon by abutting against the enlarged tapers 14.

Nuts 17 have bores therethrough of a size to slidably receive the sheathing sections, these bores being enlarged at one end and threaded internally, as at 18, to engage threads 19 of the section 15. The bore of the nuts 17 is tapered intermediate the ends at 20, this taper being substantially of the same degree as the taper on the cooperating surface of the tapered portion 14 of the sheathings 12 and 13.

When the device is assembled, as shown in Fig. 4, the tightening up of the nuts 17 will move the sheathing sections inwardly of the ends of the coupling section 15 to prevent leakage therepast or the entrance of dust or the like into the interior of the rotatable mechanism, the tapered portions of the nuts engaging tightly against the enlarged tapered portions of the sheathings.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. Driving mechanism comprising a relatively long rigid shaft adapted to be rotated, a flexible shaft connected to one end of said rigid shaft to rotate therewith, a sheathing section enclosing said rigid shaft and having an enlarged end, a second sheathing section enclosing the flexible shaft and having an enlarged end, a coupling section engaging the enlarged ends of said sheathing sections, and nuts slidable on said sheathing sections and engaging the adjacent ends of the coupling section and abutting against said enlargements to hold said parts in assembled relation.

2. Driving mechanism comprising a rigid shaft section, a flexible shaft section connected thereto for rotation therewith, a sheathing section enclosing each shaft section, a tapered enlargement adjacent the free end of each sheathing section, a coupling member having its ends fitted over the free ends of said sheathing sections and formed with a restricted central bore to receive the coupled ends of the shaft sections, and nuts threaded onto the ends of said coupling member and formed with interior tapered portions for engagement with the tapered portions on the sheathing sections.

In testimony whereof, I have hereunto signed my name.

GEORGE J. DUNBAUGH, Jr.